United States Patent
Kurelek

[11] Patent Number: 5,697,412
[45] Date of Patent: Dec. 16, 1997

[54] HIGH CAPACITY FELLER HEADS

[75] Inventor: John Kurelek, Brantford, Canada

[73] Assignee: Tigercat Industries Inc., Brantford, Canada

[21] Appl. No.: 811,745

[22] Filed: Mar. 6, 1997

Related U.S. Application Data

[63] Continuation of Ser. No. 392,230, Feb. 22, 1995, abandoned.
[51] Int. Cl.$^6$ ............................................ A01G 23/08
[52] U.S. Cl. .................... 144/34.5; 144/4.1; 144/336
[58] Field of Search .................... 144/34.1, 34.5, 144/4.1, 24.13, 336, 339

[56] References Cited

U.S. PATENT DOCUMENTS

| | | | |
|---|---|---|---|
| 3,468,352 | 9/1969 | Larson et al. | 144/34 E |
| 3,910,326 | 10/1975 | Tucek | 144/34 E |
| 3,911,981 | 10/1975 | Tucek | 144/34 E |
| 4,909,291 | 3/1990 | Tremblay | 144/3 D |
| 5,109,900 | 5/1992 | Gilbert | 144/3 D |

Primary Examiner—W. Donald Bray
Assistant Examiner—Gene L. Kim
Attorney, Agent, or Firm—R. Craig Armstrong

[57] ABSTRACT

The felling and bunching head for severing and grouping trees has a shear or saw or the like for severing trees, and an accumulation area for accumulating severed trees, extending rearwardly from the shear or saw, substantially outwardly and away from a centerline of said head. Taker and tucker arms are pivotally mounted to pivot towards and away from the accumulation area. The taker and tucker arms are mounted via pivotal connections located substantially outwardly from the shear or saw on the opposite side of the centerline from the accumulation area, on substantially the same axis. The taker and tucker arms have generally similar geometries facing the accumulation area, as viewed from above, thereby presenting generally similar geometries to trees in the accumulation area, thereby minimizing jostling of the trees when they are alternately held in the accumulation area by the taker arm and by the tucker arm.

16 Claims, 13 Drawing Sheets

HIGH CAPACITY FELLER HEADS

This application is a continuation of application Ser. No. 08/392,230, filed Feb. 22, 1995, now abandoned.

FIELD OF THE INVENTION

This invention relates to tree severing apparatus, and more particularly to feller/buncher heads for successively severing growing trees and grouping the severed trees.

BACKGROUND OF THE INVENTION

For many years, as trees to be harvested have been getting smaller, the forest machinery industry has been working at ways to quickly collect small trees into a bunch so that their further handling and or processing would be spent on a volume of wood approaching a large tree. Obviously it was best if this could be done as soon as possible in harvesting, ie. at tree felling, before any processing or even transposing was done. Early devices were considered successful if they could cut and accumulate anything more than one tree; heads that held the first tree and cut another, then held that also and cut a third were heralded as very advanced, and called "multiple tree heads".

Those beginnings were on northern swing boom heads where the bundle, bunch, or bouquet was to be next put into a delimber-processor which attempted to do those several trees together, and thereby put through more wood per unit time. A multiple tree head was considered quite a complex addition to a felling machine and did not receive much development push from those machines and systems that were content to leave the trees downed near their stumps. There were extra controls and hydraulics, at least another arm or two and a consequent heavier tool to provide and carry around—enough disadvantages to accept the dump out time for each tree done alone, even though it be a small tree.

However several other systems where there was some benefit to having the felled trees in bunches on the ground ie where newly improved grapple skidders could now replace cable skidders, or where large capacity cable machines could single choke bunches, soon took advantage of the new available technology. The benefit of being able to build bigger bunches on the ground (several drops of two, sometimes three trees each) was worth the extra complexity, cost and weight of a multiple tree head. Another example of its good use was on feller forwarders where several hundred trees were felled and placed on the felling vehicles tree bunk and then hauled out to a trucking road.

Since these developments dealt with relatively limited lift capacity swing booms and since, for processing, even three trees was more than enough, the various ideas for multiple tree heads had a similarity—the tree butt space down at the severance device did not change much in size or shape to accommodate many trees but rather stayed the same as if only big singles were to be taken. And further, the arms provided did not have a system for taking and tucking in trees in a neat sequence—rather they pulled in (and regrabbed) every tree to the center hoping that some would move to one side or the other rather than crisscross on each other. This wasn't really good enough if we contemplate that we provided machine lift and carry capacity for a single 16 inch 4000 lb. tree and often took only four 6 inch trees to total 1600 lbs, but that has been the accepted norm. This is partly explainable in that many swinging boom machines don't really have ability to pick up a big tree at a long reach (only by getting close) so not much is lost with 1600 lb bouquets over a good part of the swath area.

It should be noted also that most swinging boom mounted felling heads utilized a "center post frame construction". It was the best way to get good force flows from tree to head to boom to machine—all in one vertical plane, but it is not good for operator visibility to the next tree being cut. Usually the next tree is taken in the middle of the head and for the operator is largely hidden by the "center post" and by any trees already cut and being held in the arms.

In southern pine operations better terrain allowed the use of wheel type felling machines with front end boom mounted felling heads. Being converted front end loaders with high carrying capacity there was early encouragement to collect more trees before dropping the bouquet on the ground (multiple tree processors were never in the picture). With twin arm booms to accept force flows the heads could be made with twin posts lining up with the arms and an open center through which the next tree could be seen. As the idea of multiple tree heads described above became known these machines were soon available with extra arm which provided small tree harvesting in bouquets of 2, 3 or 4 trees.

Some southern developments continued past those in the north. A small pouch or pocket in one shear arm and tucker arms that favoured trees to that side resulted in bundles averaging perhaps 5 small trees. However in spite of their open center twin post frames visibility to the next tree was only sometimes good, because the center area was quickly blocked off as trees were collected in the head.

In response to the want for near full machine payload with various tree sizes a further development in the south provided a large stationary pocket to one side. After being cut near the center of the head, trees are swept totally to one side into the pocket by a broad taker and held there by an opposing tucker. These fixed side pocket heads do hold small trees to the capacity of the machine, commonly 10 trees and sometimes as many as 15 or 20.

These high capacity multiple tree heads could now rightly be called bunching heads because sometimes the bunch they put down was enough for a small skidder to make a trip with, and two drops were enough for a big skidder. Limitations of these devices included:

To some extent their performance is affected by how well the arms and pocket have been arranged—putting together a bundle of 10 or more full trees without strays or crisscross requires correct geometric action and substantial fabrications and hydraulics.

Another criticism is that the accumulated bouquet is far enough to one side to affect the stability of the carrying vehicle, perhaps contributing to rollover dangers.

SUMMARY OF PRESENT INVENTION

The bunching shear or head of the present invention was designed to improve on existing heads in at least those two areas mentioned above. The present invention has a different "taker-tucker" system with both arms coming from the same side. The pocket location is well to the rear and sufficiently to one side to avoid closing off visibility to the next tree. Location of heavy parts is kept to the side opposite the tree pocket.

A principle of the invention that the first tree should be taken into a guiding corner, then held there by the tucker. The next tree should be brought in parallel to the first and into the corner formed by the first tree and the guiding pocket corner. Without disturbing this foundation bundle the tucker should regrab another tree, and so on. This appears to happen quite naturally if both the taker and tucker have similar inside shapes and swing about the same (vertical)

axis. The resulting bouquet is as compact at the top as its tree crowns permit, hence easiest movement of the loaded machine amongst the remaining standing trees.

With the usual arrangement of other heads, the taker being pivoted on one side and the tucker on the other, the two can not easily be made to agree where in the pocket to start building the new bundle. The taker places the tree in its corner with a broad sweeping arm and the narrow tucker must often move it to its corner or elsewhere. Thus with each new tree take, tuck and bouquet rearrangement there is an opportunity for a crisscross to occur. Crossing of trees in the head is bad because if causes tree breakage and reduces head capacity. The resulting splayed bouquet does not pile well and while being carried about does damage to crown limbs on remaining standing trees.

To help balance the weight of the trees in the pocket being to one side, the design of the present invention used severance geometry that concentrates the hardware low and to the side opposite the pocket. The head when empty is heavy on the nonpocket side; it becomes balanced at more than half full and is heavy on the pocket side when full. In comparison with prior art devices this geometry also puts the tree bouquet far to the rear of the head—always desirable for reducing front axle loading.

A further is to essentially weight balance the empty head on the boom center line and revise the pocket attitude to a built-in lean so that the center of gravity of the bouquet of trees being carried is nearer to the machine center line than if the pocket attitude was vertical. This idea has at least two advantages.

The first is that it allows the load of trees plus head to be carried centerd on the machine boom for best stability and lowest stresses.

The second advantage has to do with the movement of the tree from its severance position to its pocket position. When large heavy trees are bodily moved from their upright vertical position at the stump a distance of two feet to another upright vertical position in the pocket the tendency is for the butt of the tree, being pushed by the taker, to slide ahead of the rest of the tree until it comes in contact with the pocket wall. This is smoothly done at velocities equal to those available from taker hydraulics. The rest of taking and tucking that tree is not as smooth because these arms operating at about breast height on the tree, then pivot it about its butt contact in the pocket and attempt to snap it into alignment with the pocket and upper tree retaining structures. Inertia imparted into the tree must eventually be absorbed by machine stability.

The improvement of the present invention is to arrange the upper pocket structure in relation to the lower pocket that after the initial movement of the butt by means of tree rotation there is no need to snap the tree vertical but rather it can be supported and carried at that alight angle ie., its c of g not from its starting position. In the practical execution of this principle the bottom of the tree is moved sideways— say to the left about half a diameter and rear ward at least one diameter (more if the pocket is empty). The top moves slightly to the right and to the rear more or less depending on the fore and aft attitude setting of the tilt mechanism by the operator. It is significant that fore and aft movement which is naturally easily tolerated by these vehicles is used to relocate the tree into a pocket position and side to side movement which is bad for stability is kept to a minimum. Thus the Present Invention has the Following Advantages 1) Has capacity for several small trees, enough to nearly equal one big tree in weight. (By itself this is not a new idea). Also have the ability to handle one large tree.

2) Provides a substantially sized tree accumulation pocket to the side and rear of the tree severance place.

3) Takes and tucks trees into the pocket starting in a defined corner with the taker and tucker on or nearly on the same axis.

4) Takes and tucks trees into the pocket with minimized sideways movement of the tree's center of gravity.

5) Balances the loaded head on the boom center line with a fixed lean of the pocket structure.

6) Gathers and cuts trees near vehicle center line.

7) Carries accumulated trees in a position to permit operator to see base of next tree.

Severance Methods Involved

The above is intended to apply for the common methods of cutting through the tree, namely, shears, high speed saws, chain saws and low speed high torque saws. The weight of components, the cycle times and precise geometry are different but the principles of the improvements are the same, with only some variation in the degree of their effect. Other severance methods may also be usable.

Other Possible Applications

These improvements in taking and tucking a big but neat bouquet could also benefit swing boom machines especially if used for small tree harvesting such as in plantation thinning. The twin post designs could be modified to a single post favouring the pocket side of the head. This would leave the cab side open for visibility to the severance device and the tree being cut—and not being blocked off by the trees as they are accumulated in the pocket. Although this scheme would tend to build the load near the boom center line we could if need build in some side lean to the pocket structure as described above. Since side tilt mechanisms are usually used with these heads we might say that the operator could make the balance correction when needed but a further improvement idea could be designed to automatically adjust side tilt for near zero boom twist. The same argument for not moving the whole tree sideways would still apply because even with a side tilting head its inertia, partly loaded, would prevent quick accommodation to the tree axis.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
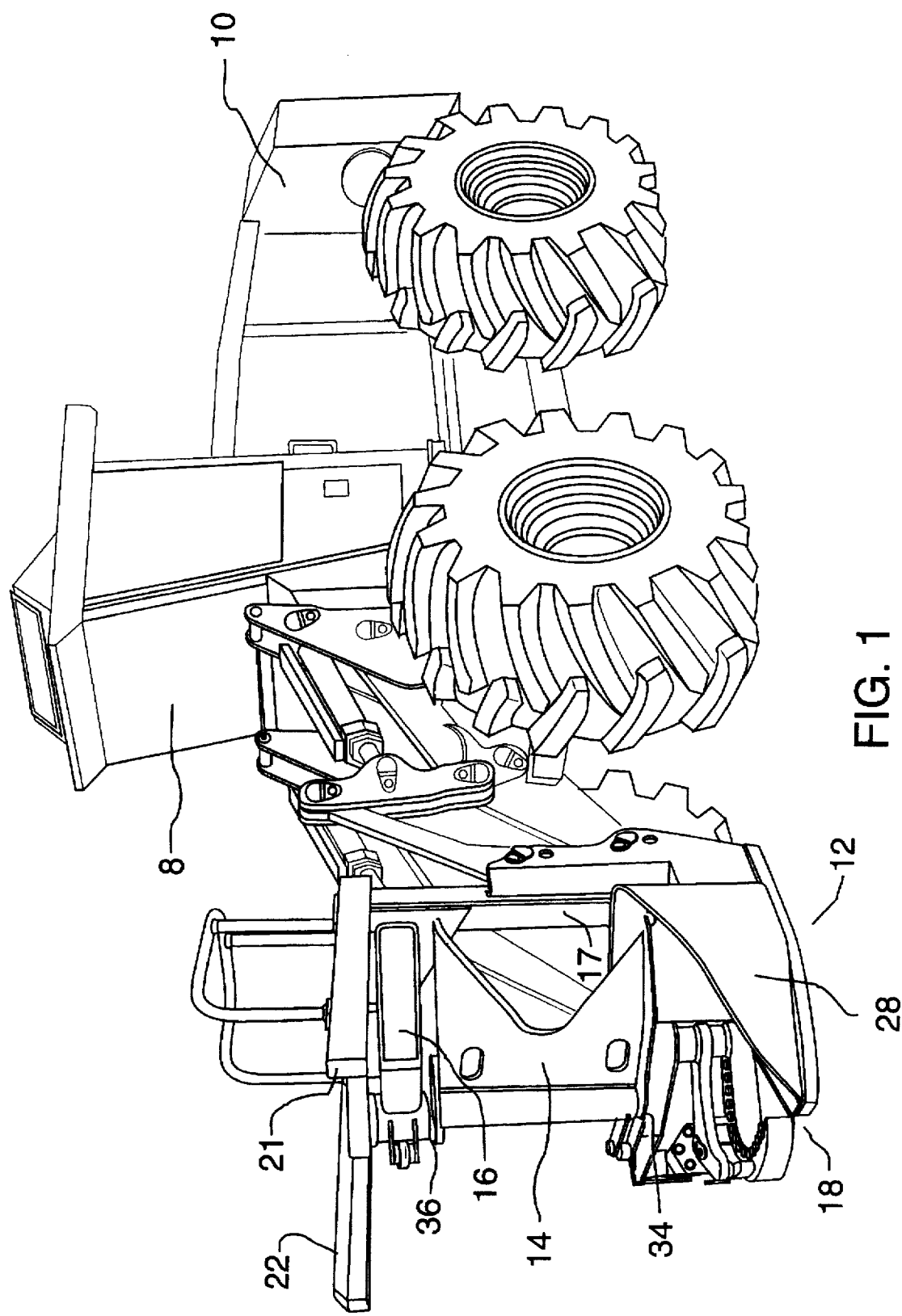
FIG. 1 is a left perspective view of the feller head attached to a logging vehicle.
Figure 4:
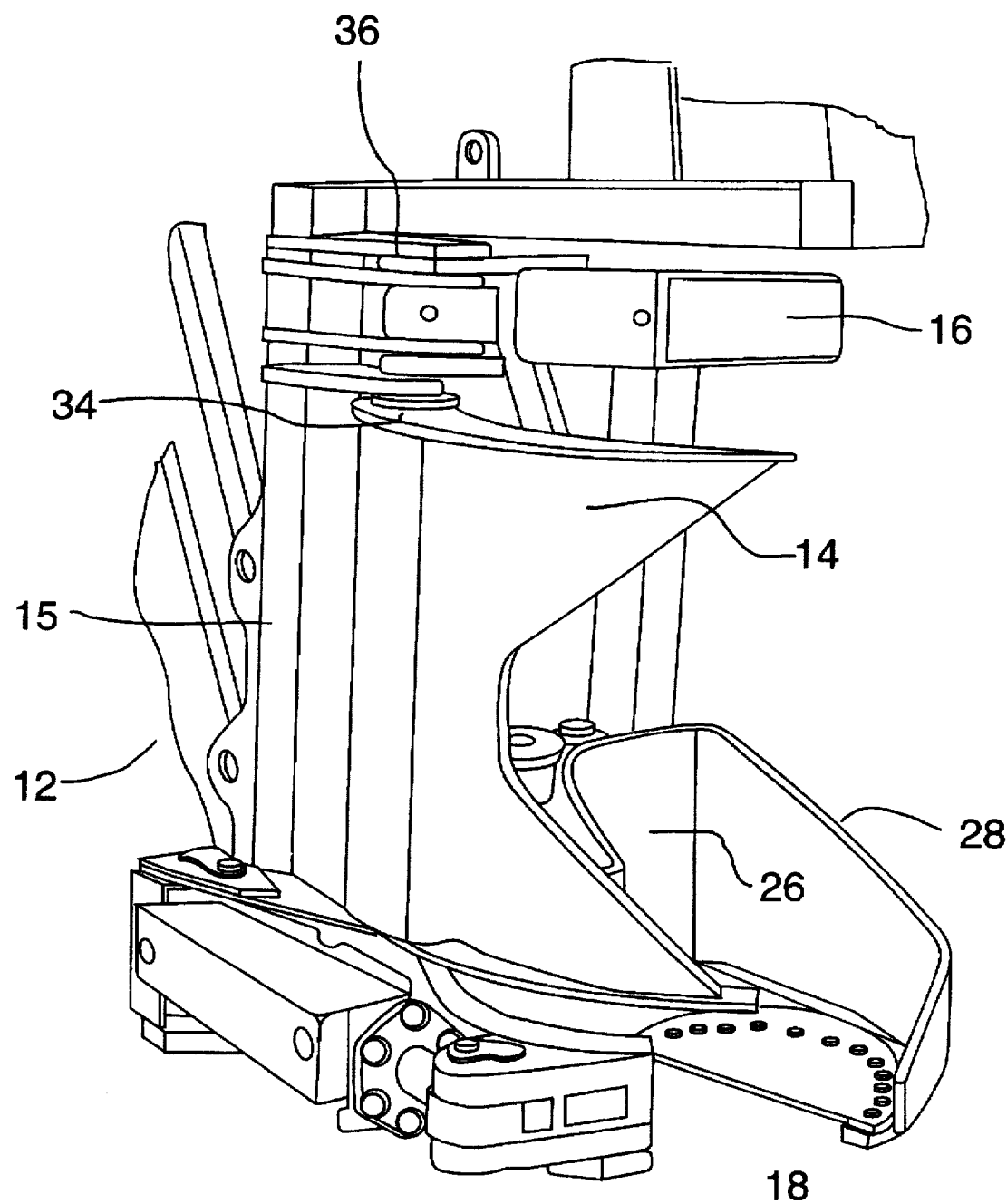
FIG. 4 is a perspective view of the feller head.
Figure 5:
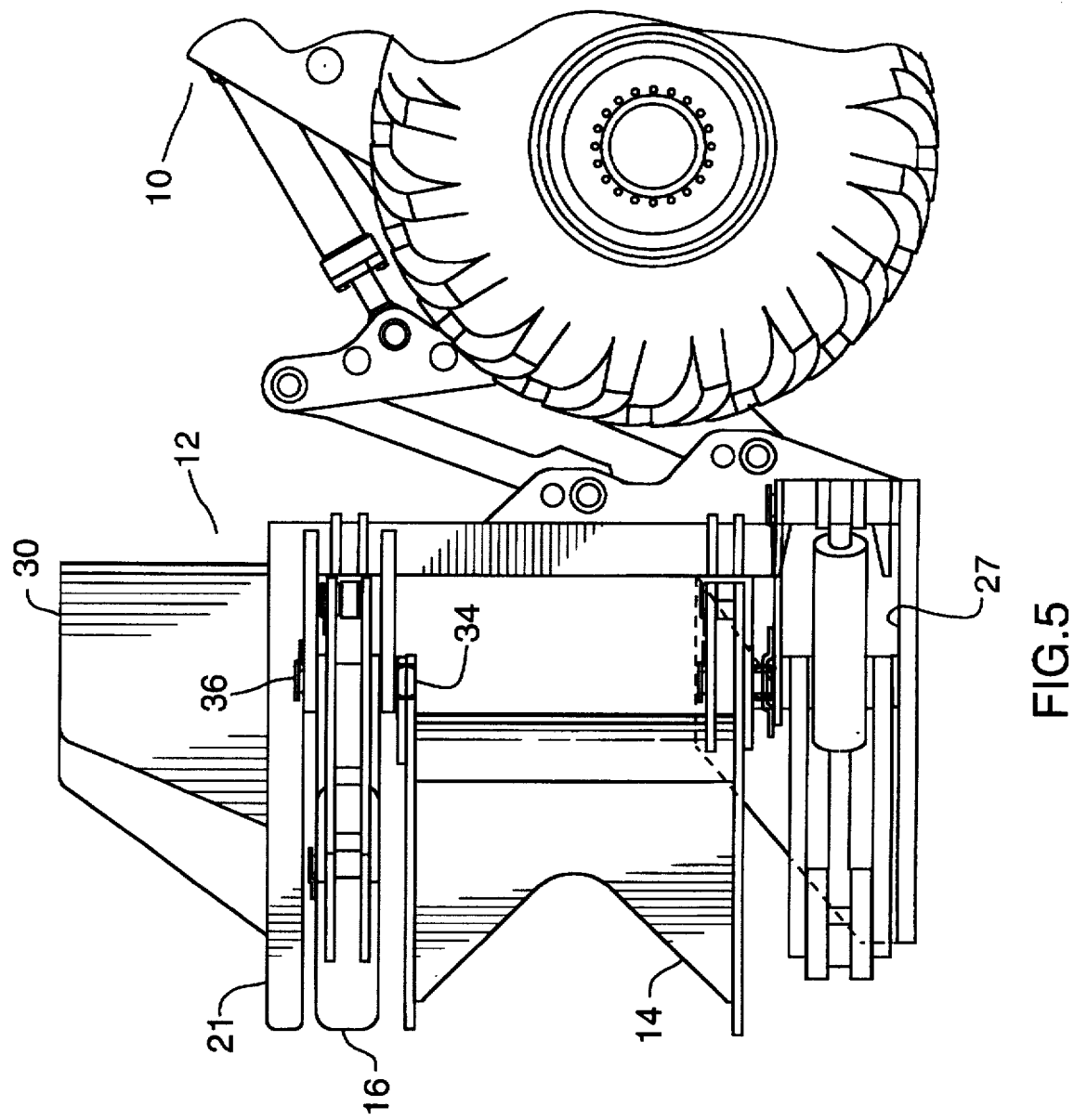
FIG. 5 is a side view of the feller head attached to a logging vehicle.

Referring to FIGS. 1 and 4, there is shown a feller/buncher head 12 attached to a logging vehicle 10. The head 12 has a base, two side members 15 and 17, and an upper frame. The base contains the cutting means 18 and an accumulation area 26. The upper frame consists of two horns 21 and 22 which are generally horizontal and project forwardly away from the vehicle 10, and an optional extension 30.

Attached near side member 15 of the head are two power operated arms. The first is the taker arm 14 which is the larger of the two arms and which is located under the second arm, called the tucker arm 16. The taker arm 14 is pivotally connected at 34 to the head to allow pivoting rotation through the cutting area and into the accumulation area 26.

The tucker arm 16 is also pivotally connected to the head 12 near the side member 15. Tucker arm 16 is also configured to permit pivoting motion through the cutting area and into the accumulation area 26.

Figure 8:
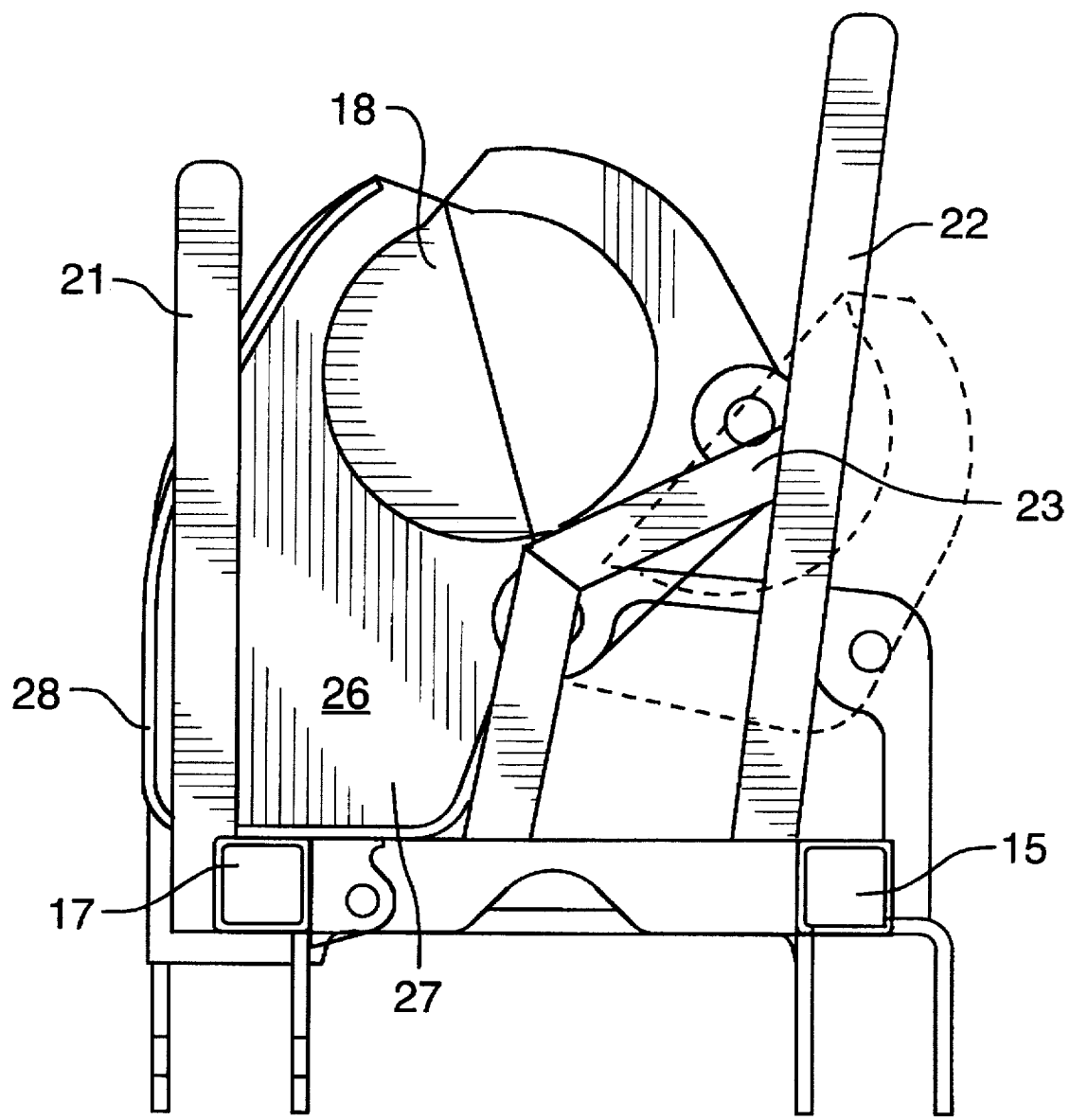
FIG. 8 is a top view showing the relation of the top pocket (i.e. the horns) to the lower pocket (accumulation area).

The accumulation area 26 can be seen clearly in FIG. 4 to include a generally J-shaped wall of varying height 28 and a floor 27. Referring to FIG. 8 the accumulation area can be seen to be located generally sidewards and rearwards of the cutting means 18, with the accumulation area 26, sometimes referred to as a pocket, being oriented with its longer dimension parallel to longitudinal axis of the vehicle.

Figure 2:
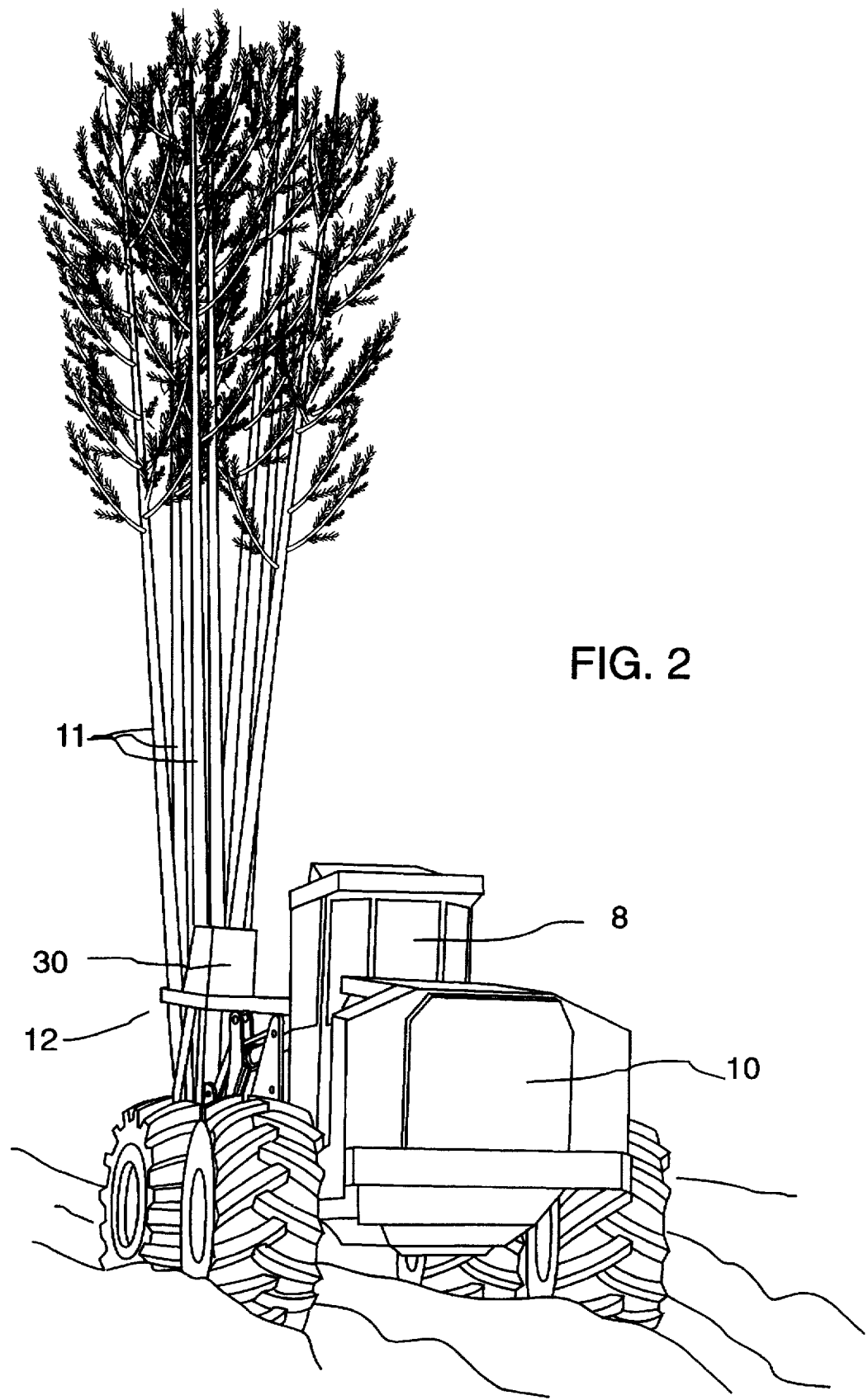
FIG. 2 is a rear view of the vehicle with the feller head attached, in operation.

Location of the accumulation area 26 to the side offers significant improvements in visibility to the operator over prior art apparatus. Referring to FIG. 2 a vehicle 10 with a feller head 12 is seen carrying a "bouquet" of harvested trees 11. This figure is a rear view which shows the relation of the bouquet as it is carried to the position that would normally be occupied by an operator of the vehicle, ie. in the cab 8 of the vehicle.

Figure 3:
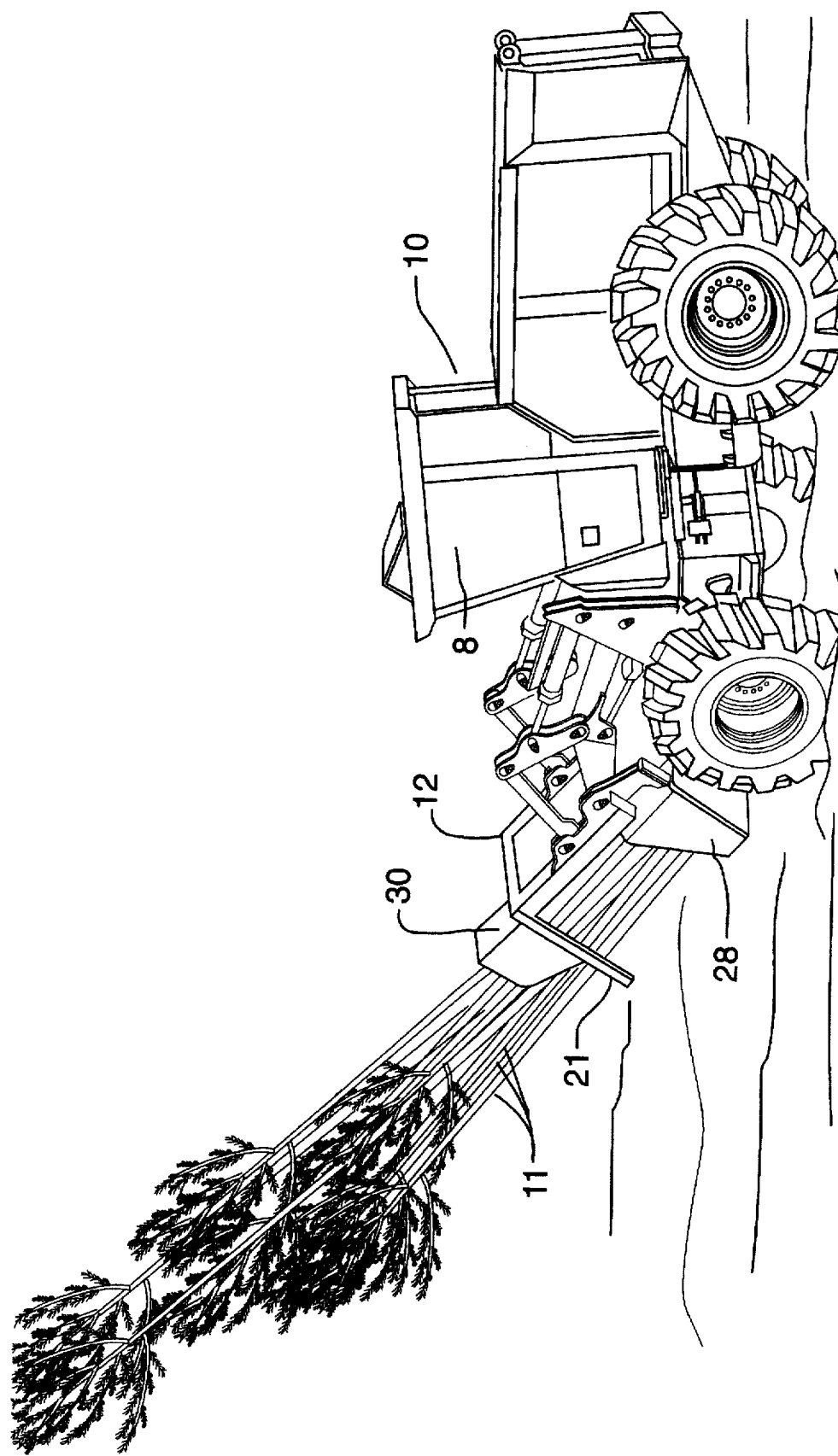
FIG. 3 is a side view of the vehicle with the feller head attached, in operation.

The bundle of trees or bouquet 11 is seen to be carried sufficiently to the side so the operator's forward line of vision remains unhindered. This has several advantages in operation. One situation where this would be helpful would be is dumping a load as shown in FIG. 3. In this operation an operator attempts to lay a group of trees in a pile so a skidder can pick them up. To neatly perform this operation and place the trees, proper visibility is required.

The greatest advantage of this offset accumulation area 26 however is that it permits greatest visibility in the crucial felling operations. With the configuration of the present invention the tree-gripping and severing apparatus can be located substantially on the central longitudinal axis of the vehicle 10. This permits widest range of cutting for an operator without unecessary vehicle movement.

A wide variety of different locations and geometries have been attempted for accumulation areas with a number of prior art devices. Most current buncher heads (perhaps between 50–75%) are provided with central accumulation areas, ie. the areas are located near the axis defined by the lateral center of gravity for the vehicle 10 with the head 8 attached. While this has the advantage of carrying the load of stored trees near the lateral center of machine stability, and thus providing a stable load, it results in several disadvantages.

Prior art apparatus with central accumulation areas reduce visibility, which is undesirable for the reasons noted above.

In addition, packing of the severed trees into these central accumulation areas is inconsistent. As described earlier trees may be forced to the right or left of the severing means after severance. Sometimes they are forced first to one side and then to another. This is quite undesireable as it results in criss-crossing and breakage and reduced capacities in the accumulation areas.

Figure 6:
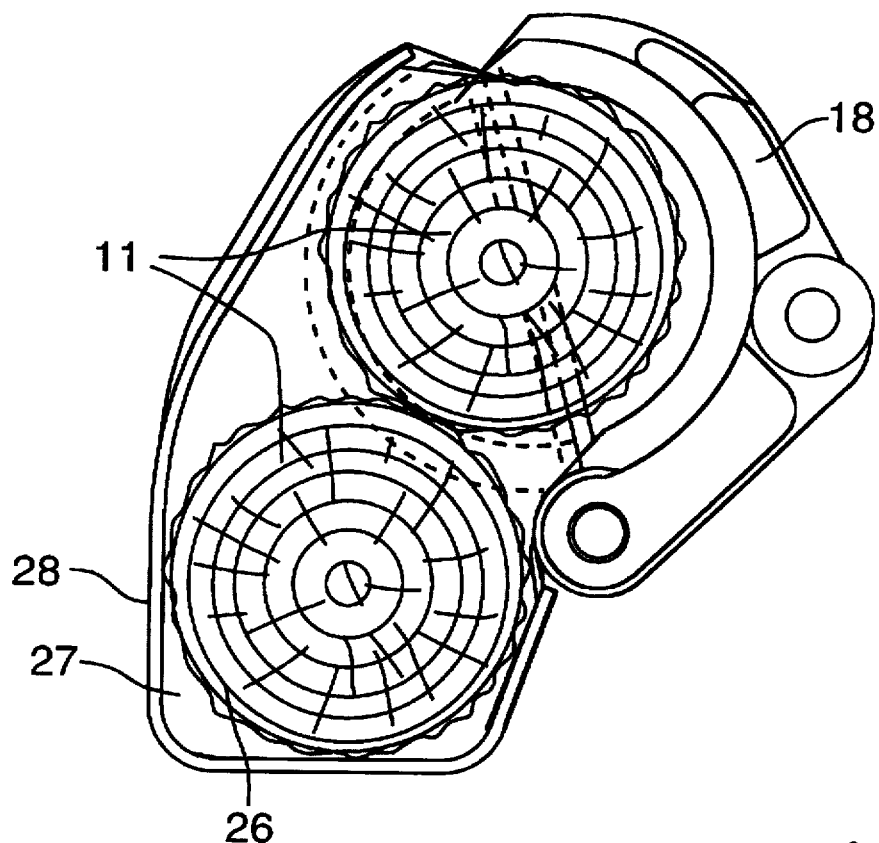
FIG. 6 is a plan view of the severance and accumulation areas showing storage of a full-size tree, i.e. one consistent with shear capacity, and another full-size tree being severed.
Figure 7:
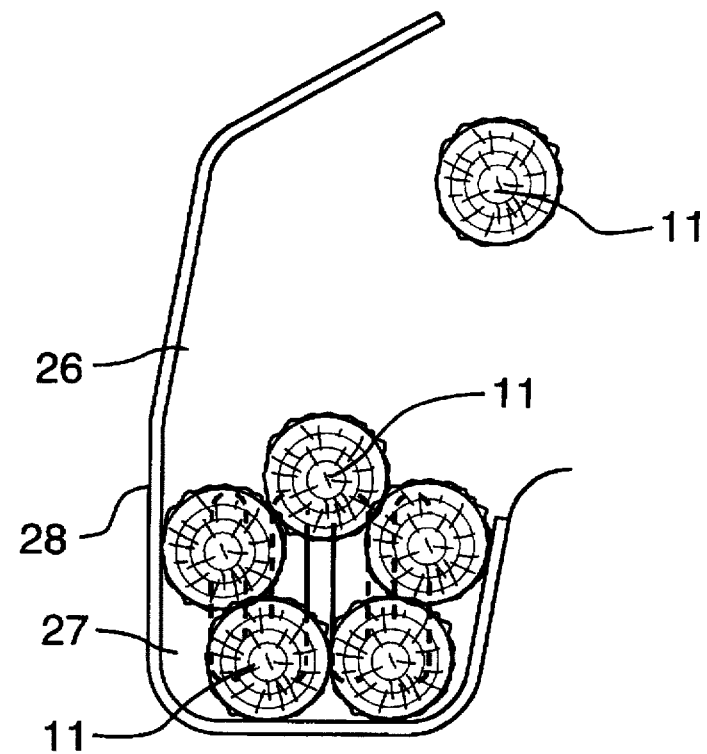
FIG. 7 is a plan view of the severance and accumulation areas showing storage of smaller trees.

Packing of severed trees is greatly improved in the present invention. Referring to FIGS. 6, 7 and 10a–j, the packing sequence is seen. FIGS. 6 and 7 show the accumulation area 26 having a side wall 28. The side wall has two distinct "corners" which typically have radii equal to or less than the typical tree that will be severed. These corners encourage trees to locate there and remain there when further trees are accumulated. In particular the first severed tree to locate at the corner closest the center of the area, called the inside corner. Later severed trees tend to accumulate in an order far more consistently than prior art geometries.

FIGS. 10a–j show a typical order and location of accumulation for a number of smaller trees. These Figures also show how the tree-gripping means 14 and the tree-embracing means 16 co-operate to achieve this packing.

In this embodiment the severing means is a hydraulically-powered shear which is well-known in the art. It should be noted that disc saw cutting could easily be employed with the present invention with minor modifications.

Figure 10A:
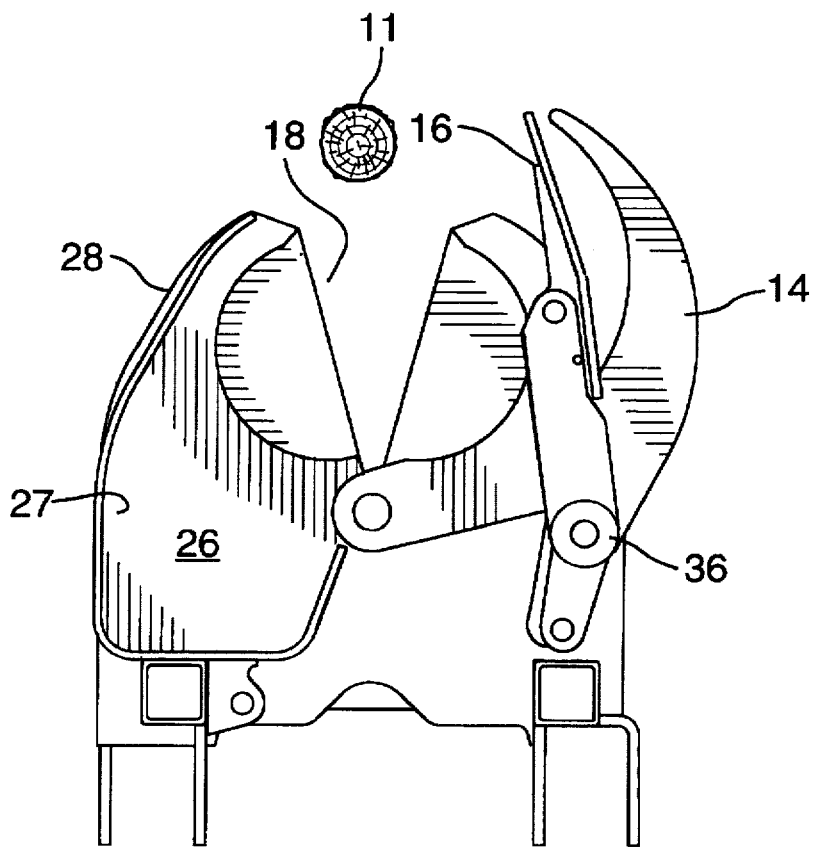
FIGS. 10a–10j are various plan views showing the sequence of operations to sever and store several small trees.
Figure 10B:
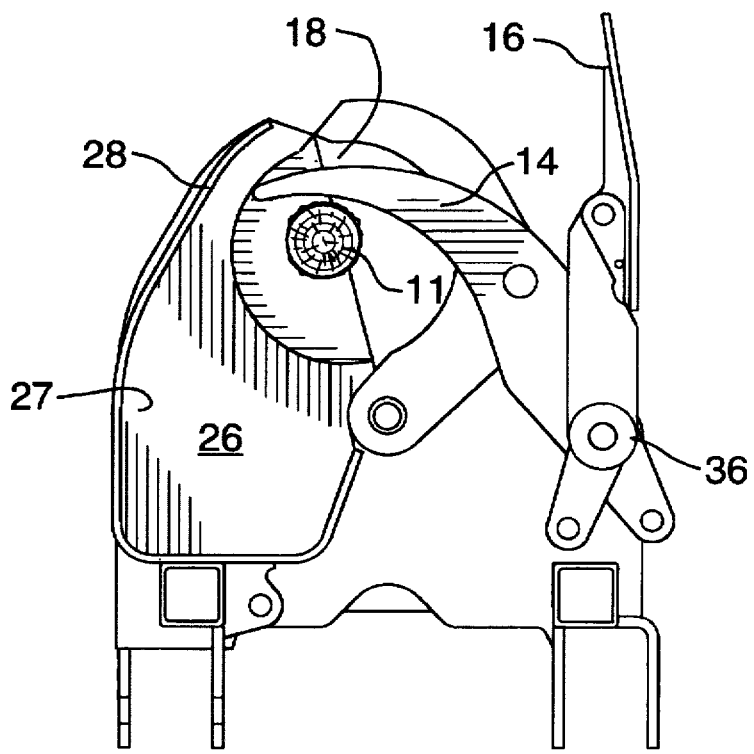
Figure 10C:
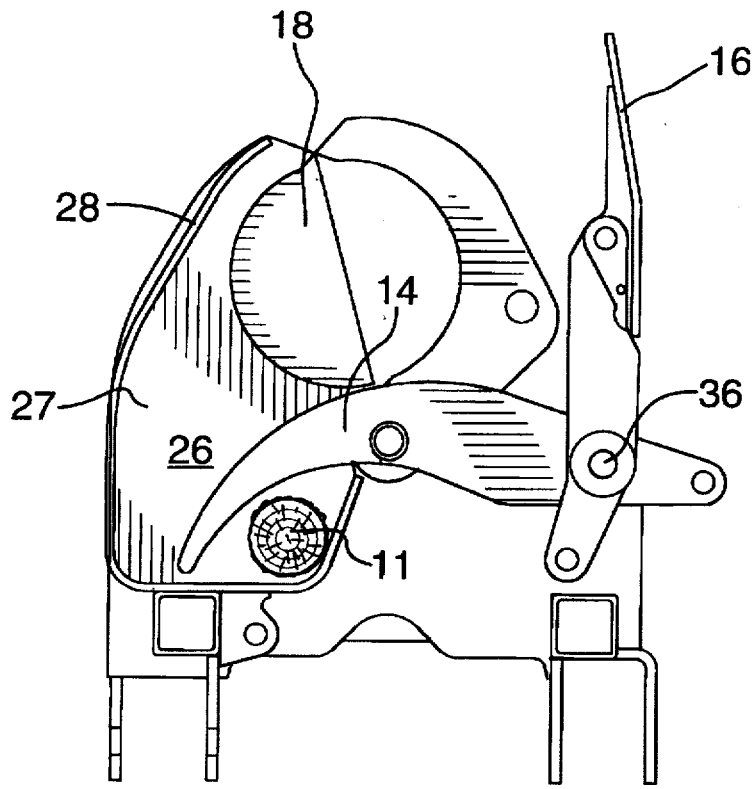
Figure 10D:
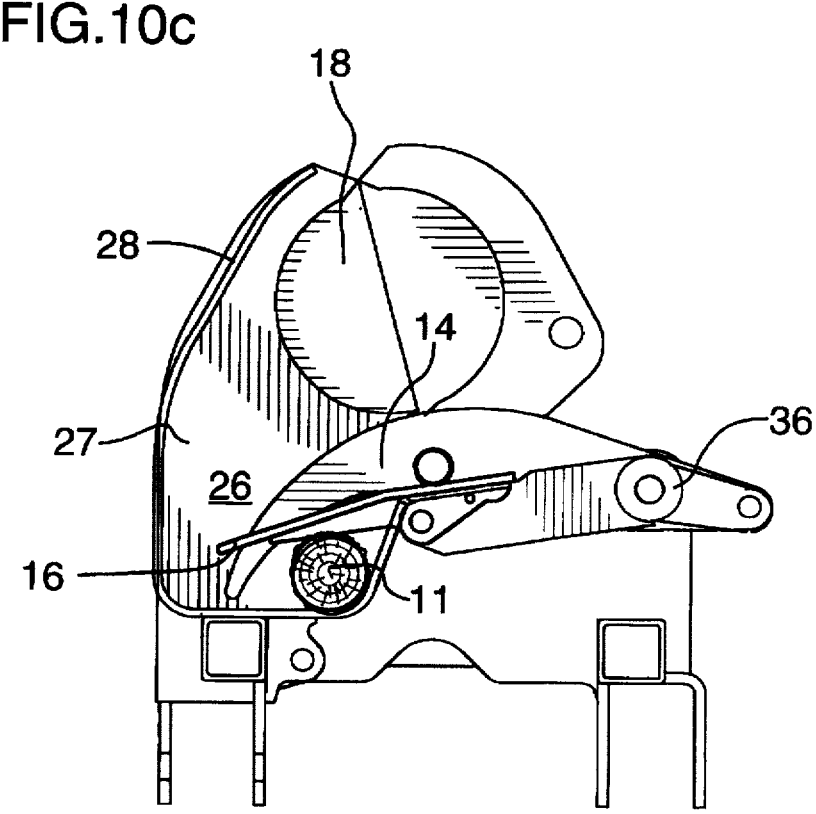
Figure 10E:
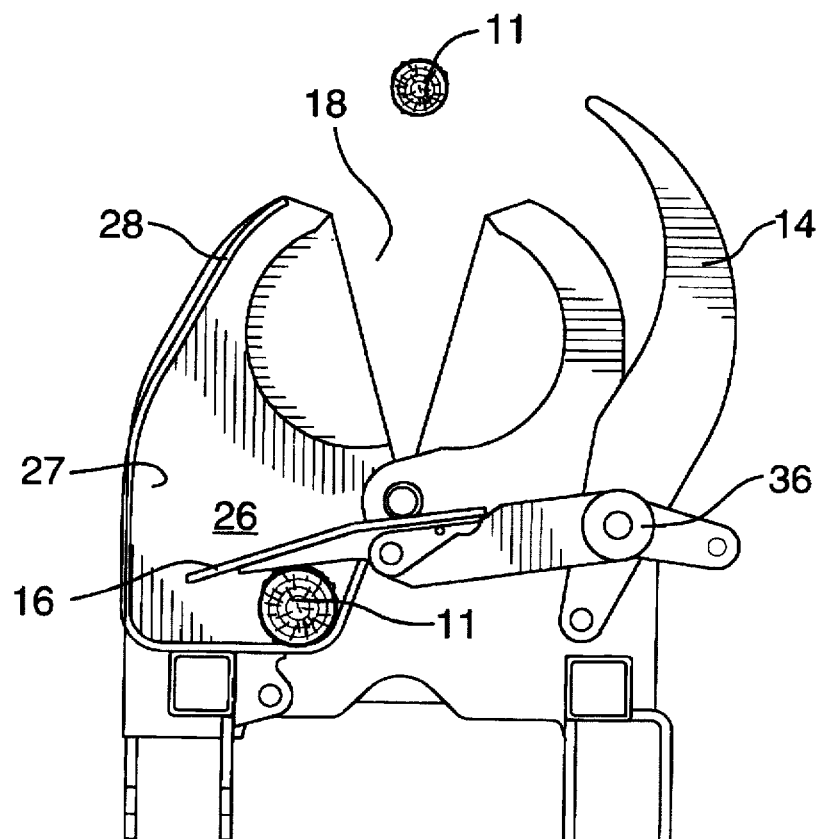
Figure 10F:
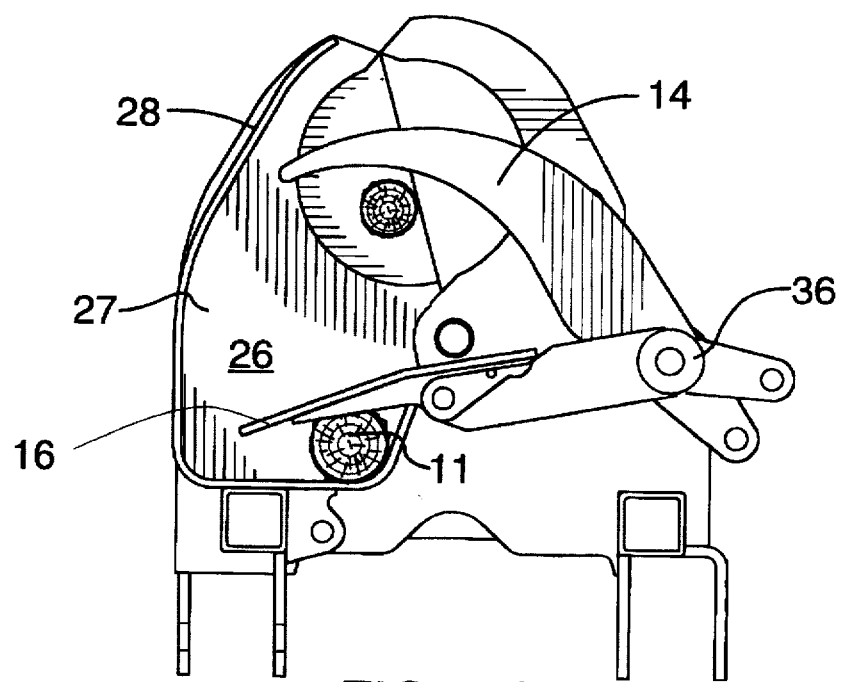
Figure 10G:
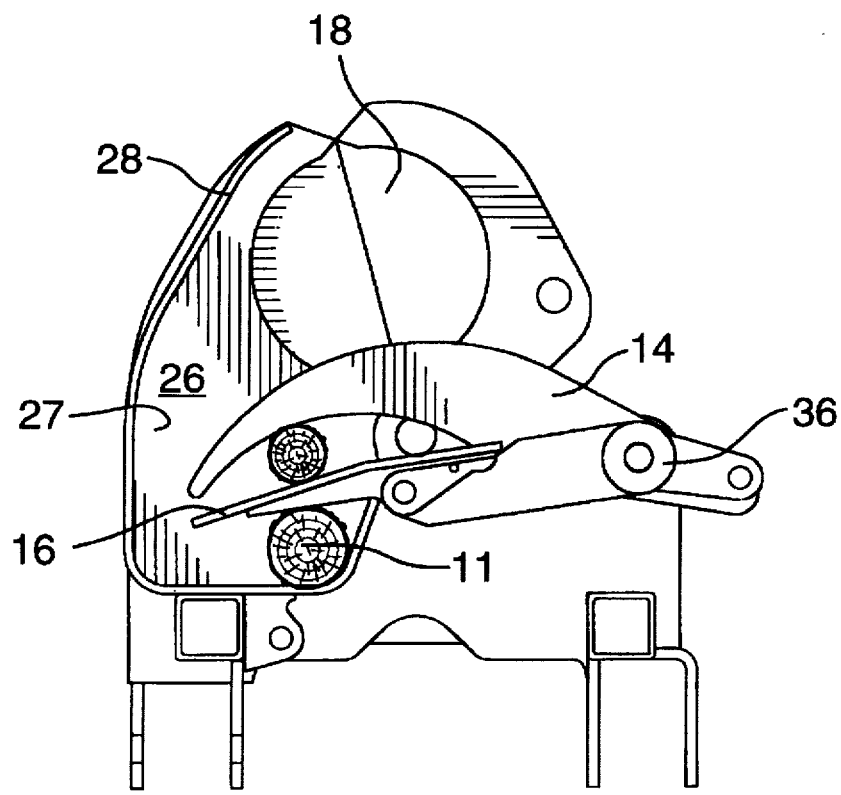
Figure 10H:
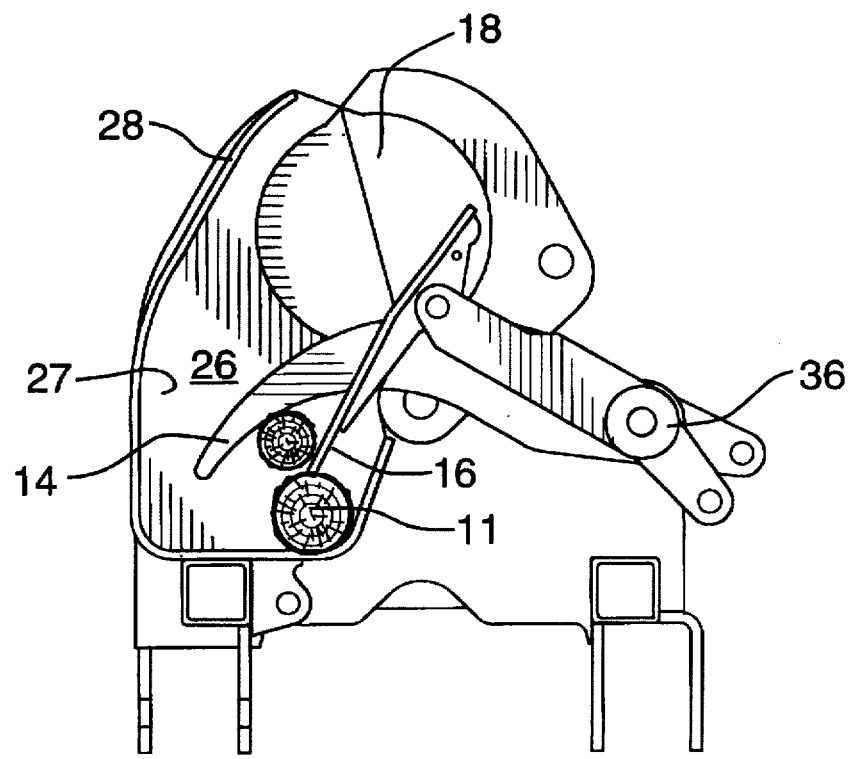
Figure 10:
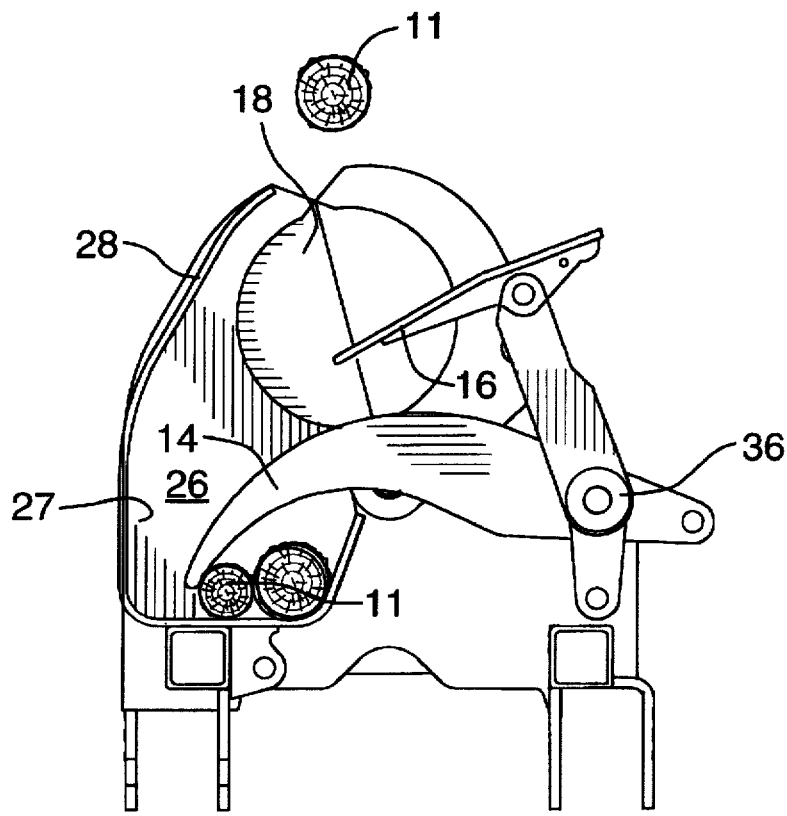
Figure 10:
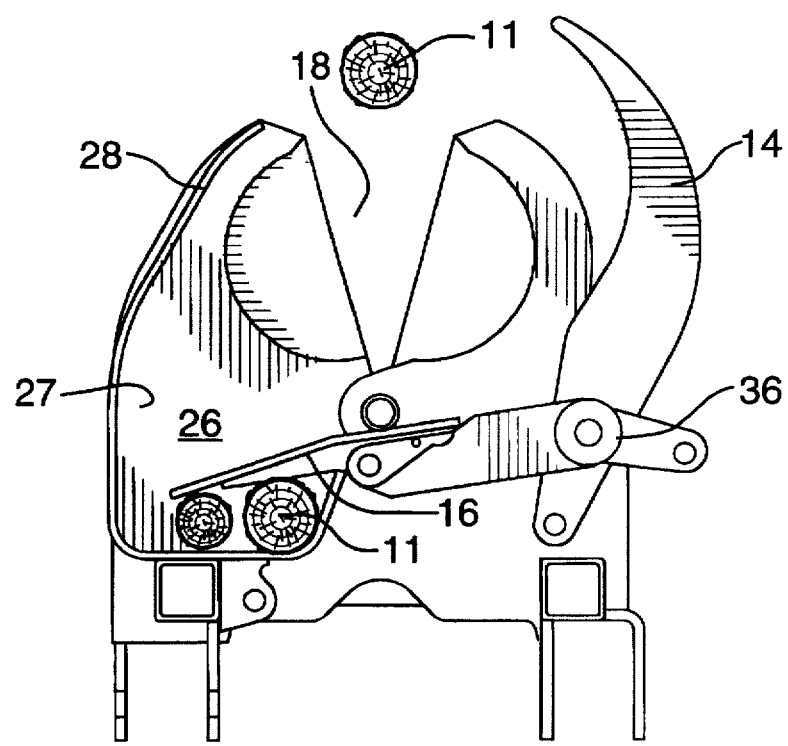

Once severed the taker arm 14 then moves the base of the severed tree to the rear of the accumulation area 26. The tucker arm 16 then is engaged against the tree, "embracing" or holding it in place in the accumulation area. The taker arm then retracts and another tree is located, gripped, and severed. FIG. 10a shows two severed trees held by the tucker arm 16 while a third tree, which has just been severed is drawn towards the rear wall of the accumulation area 26 by the taker 14. The third tree is drawn against the tucker 16 by the taker 14. The tucker 16 then "withdraws" by virtue of its hinged design.

The operation of takers and tuckers and the variety of forms they take is well-known in the art. Snake arms, tuckers and other hinged retractable embracing means have been known for about 20 years. The unique feature here is that just a single taker and tucker are employed, and that they both pivot from the "same side" of the severing means.

In prior art devices where just a single taker and tucker are used, often in conjunction with a substantially central accumulation area, the taker and taker are almost always connected on opposite sides of the severing means. Thus, these two arms operated, in effect, in opposite directions. In many cases this causes the criss-crossing, breakage and reduced capacity already referred to. The taker would move the tree to one side of the accumulation area and then the tucker would often "move" the tree to the other when it was engaged.

In the present embodiment shown in the drawings, the taker and tucker pivot axes 34 and 36 are actually the same, with both arms being retained with a single pin. While it is not necessary for the axes to be the same, this does provide simple design and has produced excellent results. The invention herein lays claim to any two pivot points in close proximity being located on the opposite side of the severing means as the accumulation area.

Figures 9A, 9B:
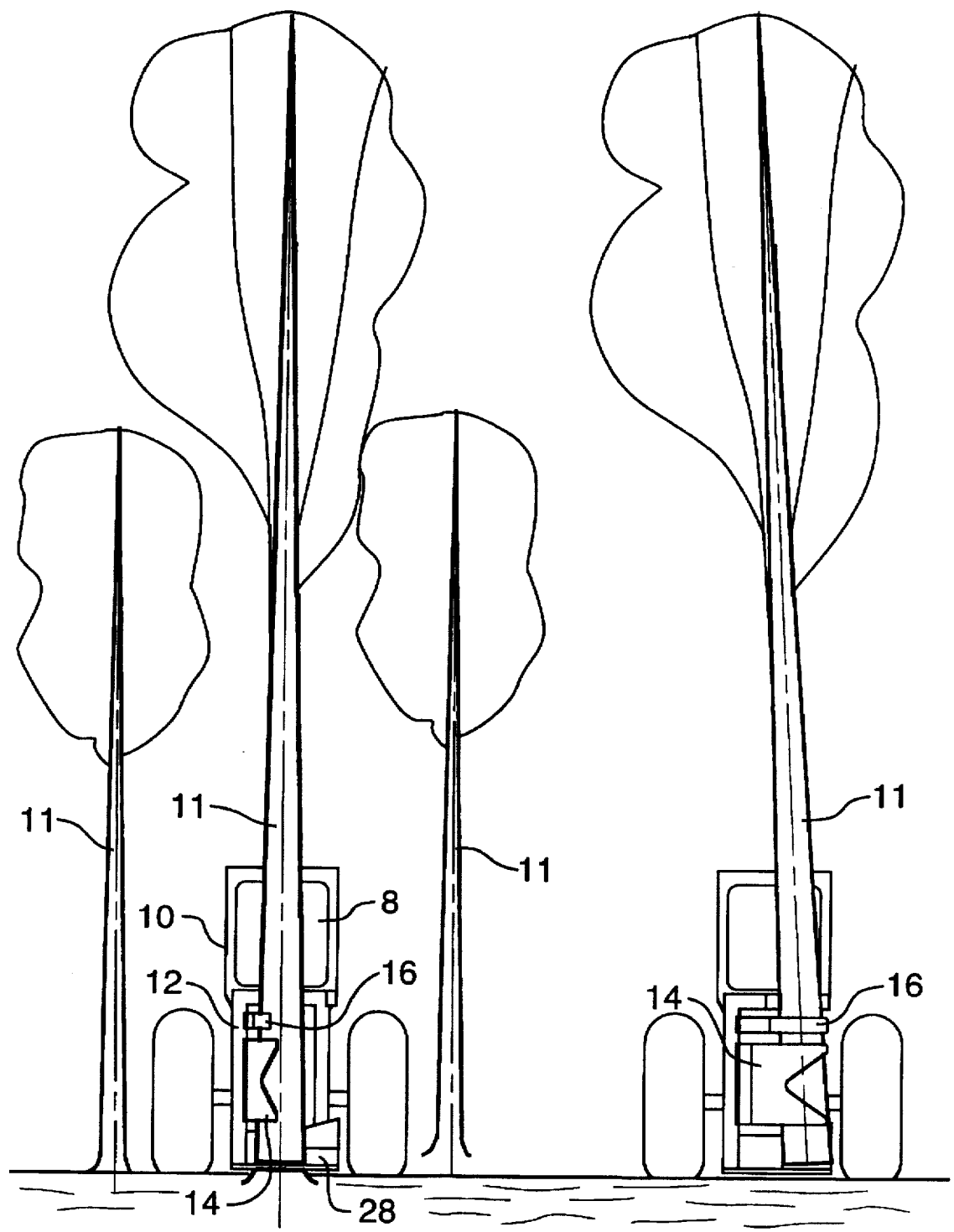
FIG. 9a is a front view showing the orientation of a tree with respect to the vehicle during the cutting phase.
FIG. 9b is a front view showing the orientation of a tree with respect to the vehicle during the carrying phase.

Having an accumulation pocket located in a laterally disposed position to the vehicle's center of gravity can cause stability concerns. To accomodate this FIGS. 9a and 9b show how the vertical orientation of the bouquet (or a single tree as illustrated) is tilted a certain extent. This is achieved by "offsetting" the upper pocket area defined by the horns 21 and 22 and the elbow 23. In particular, the inside edge of the left horn (left and right as defined by an operator's position) is offset horizontally towards the center of the machine visa vis the inside edge of the lower pocket wall 28. This induces the bouquet to "lean", moving the center of gravity of the bouquet inwards towards the center line from where it would be if the trees were held vertically, increasing loaded carrier stability.

What is claimed in the invention is:

1. A felling and bunching head for attachment to a vehicle, for severing trees and grouping the severed trees, comprising:

support means for attachment of the head to the vehicle;

tree severing means mounted to a lower portion of said support means, ahead of said support means;

an accumulation area for accumulating severed trees, extending substantially rearwardly from said tree severing means, positioned substantially outwardly and away from a centerline of said head;

a taker arm pivotally mounted on said support means for moving trees from said tree-severing means to said accumulation area; and an articulated tucker arm mounted on said support means, also moveable towards and away from said accumulation area, centrally articulated so as to permit retraction from said accumulation area when said taker moves a tree to said accumulation area;

said taker arm and said tucker arm both being pivotally connected to said support means with pivotal connections, said pivotal connections being located substantially outwardly from said tree-severing means on the opposite side of said centerline from said accumulation area, and substantially outwardly from said centerline, on substantially the same axis, and ahead of a rear portion of said accumulation area, said taker arm and said tucker arm having generally similar geometries facing said accumulation area, as viewed from above, thereby presenting generally similar geometries to trees in said accumulation area, whereby jostling of said trees is minimized when they are alternately held in said accumulation area by said taker arm and by said tucker arm.

2. A felling and bunching head as recited in claim 1, where said accumulation area is defined by a floor adjacent said tree-severing means, an outer wall extending outwardly and rearwardly from said tree-severing means, a rear wall extending laterally inwardly from a rearward area of said side wall, and an inner wall extending forwardly from an inner area of said rear wall.

3. A felling and bunching head as recited in claim 2, where said walls are integrally constructed from a single metal piece.

4. A felling and bunching head as recited in claim 2, where said rear and inner walls define a receiving corner, and where said taker and tucker arms and said pivotal connections are relatively positioned such that a first tree to be severed is directed by said taker arm to said receiving corner.

5. A felling and bunching head as recited in claim 3, where said rear and inner walls define a receiving corner, and where said taker and tucker arms and said pivotal connections are relatively positioned such that a first tree to be severed is directed by said taker arm to said receiving corner.

6. A felling and bunching head as recited in claim 2, further comprising structural elements spaced substantially above said inner and outer walls but offset therefrom slightly towards said centerline, whereby trees in said accumulation area are induced to lean slightly, upper portions of said trees leaning slightly towards said centerline.

7. A felling and bunching head as recited in claim 1, where said accumulation area extends sufficiently rearwardly and is sized sufficiently to accommodate the largest tree capable of being severed by said severance means, with another equally-sized tree still being severable by said severance means.

8. A felling and bunching head as recited in claim 7, further comprising structural elements spaced substantially above said inner and outer walls but offset therefrom slightly towards said centerline, whereby trees in said accumulation area are induced to lean slightly, upper portions of said trees leaning slightly towards said centerline.

9. A felling and bunching head as recited in claim 1, in which said tree-severing means comprises a pair of blades relatively moveable toward and away from each other, having open positions for receiving a tree therebetween and closed positions for severing a tree.

10. A felling and bunching head as recited in claim 2, in which said tree-severing means comprises a pair of blades relatively moveable toward and away from each other, having open positions for receiving a tree therebetween and closed positions for severing a tree.

11. A felling and bunching head as recited in claim 3, in which said tree-severing means comprises a pair of blades relatively moveable toward and away from each other, having open positions for receiving a tree therebetween and closed positions for severing a tree.

12. A felling and bunching head as recited in claim 4, in which said tree-severing means comprises a pair of blades relatively moveable toward and away from each other, having open positions for receiving a tree therebetween and closed positions for severing a tree.

13. A felling and bunching head as recited in claim 5, in which said tree-severing means comprises a pair of blades relatively moveable toward and away from each other, having open positions for receiving a tree therebetween and closed positions for severing a tree.

14. A felling and bunching head as recited in claim 6, in which said tree-severing means comprises a pair of blades relatively moveable toward and away from each other, having open positions for receiving a tree therebetween and closed positions for severing a tree.

15. A felling and bunching head as recited in claim 7, in which said tree-severing means comprises a pair of blades relatively moveable toward and away from each other, having open positions for receiving a tree therebetween and closed positions for severing a tree.

16. A felling and bunching head as recited in claim 8, in which said tree-severing means comprises a pair of blades relatively moveable toward and away from each other, having open positions for receiving a tree therebetween and closed positions for severing a tree.

* * * * *